United States Patent Office 2,899,432
Patented Aug. 11, 1959

2,899,432

QUATERNARY PYRAZOLONYL COMPOUNDS

Bernard Rudner, Baltimore, Md., assignor to W. R. Grace & Co., New York, N.Y., a corporation of Connecticut No Drawing. Application January 7, 1957
Serial No. 632,944

11 Claims. (Cl. 260—247.5)

This invention relates to novel quaternized nitrogen salts. In one specific aspect, it relates to quaternized derivatives of substituted hydrazines. In still another aspect, it relates to pyrazolonyl hydrazinium compounds.

Heretofore, pyrazolones containing an exocyclic hydrazinium group have been unknown. Although there has been a long history of chemical and medical interest in the pyrazolones and their derivatives, one can easily ascribe the novelty of the compounds of the present invention to the predictable difficulty of their preparation using established prior art methods. It is of course possible to devise paper syntheses of these compounds via pyrazolonyl hydrazine intermediates. Such syntheses could not be considered practical.

It has recently been discovered that chloramine will react with tertiary amines to form tri-substituted hydrazinium chlorides. This new reaction presents practically limitless possibilities for the preparation of novel and interesting chemical compounds which because of their structure and inherent physical properties have a wide range of uses. Tertiary amines are readily available bases. Chloramine is an excellent reagent since it can be economically obtained in commercial quantities by using the well known process of Harry H. Sisler et al., described in U.S. Patent No. 2,710,248, where chlorine and ammonia are reacted in the vapor phase to produce chloramine (monochloramine). By treating the pyrazolones and their derivatives with chloramine, I have discovered a new generic class of hydrazinium salts which have remarkable pharmaceutical properties.

It is therefore an object of the present invention to provide a new generic class of hydrazinium salts, useful for pharmaceutical and other purposes, which can be made in commercial quantities.

In accordance with the present invention I have discovered a novel and useful generic class of hydrazinium salts corresponding to the general formula:

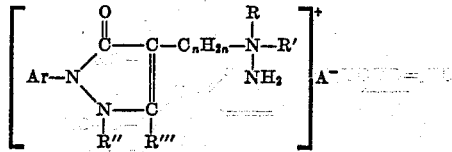

In the above formula, Ar is selected from the group consisting of phenyl, halophenyl, nitrophenyl, carboxyphenyl and sulfophenyl. R is a member of the group consisting of lower alkyl, sulfoalkyl, hydroxyalkyl, or carbon-containing residues which when taken collectively with R' represent the necessary atoms to complete an annular structure having from 5 to 6 endocyclic atoms. R' may be taken collectively with R, as indicated, to form a heterocycle. For example, if $R=CH_2CH_2-O$ and $R'=CH_2CH_2$, collectively they form the morpholine structure. R' individually is a member selected from the group consisting of lower alkyl and hydroxyalkyl radicals. N ranges in value from 0 to 3. R'' is a member of the group consisting of hydrogen, methyl, ethyl, propyl, and allyl radicals. R''' is a member of the same group and may, in addition, be $CO_2^-$, $-CO_2H$. $A^-$ can be any anion.

When my novel compounds are used for pharmaceutical purposes it is necessary that $A^-$ be a non-toxic anion, since obviously non-toxicity is of paramount importance in pharmaceutical work. On the other hand, my new compounds are also useful agents in photographic work. For this purpose the toxicity of the particular compound selected is of little or no importance and the solubility properties become of significant interest. In photographic work it is a primary requirement that the particular compound to be selected is water soluble. Such a requirement does not obtain when the new compounds are applied to pharmaceutical or medicinal uses. Other than the solubility or toxicity requirements for specific uses, the choice of anion $A^-$ is of little consequence, since the primary activity of my novel compounds resides in the cation. The salts obtained through the variation of $A^-$ may in some cases have special advantages due to solubility, ease of crystallization, lack of objectionable taste and the like, but these considerations are all subsidiary to the characteristics of the cation which are independent of the character of $A^-$. Hence all variations of $A^-$ are considered equivalent for the purposes of the present invention.

$A^-$, in addition to being a separate electrostatically attached anion, may be an anionic portion of one of the hydrazinium substituents. Specifically, when R or R' is a sulfoalkyl radical, the sulfo group contains the negative charge. Likewise the negative charge is present directly on the hydrazinium structure when R''' is $CO_2^-$ and Ar is

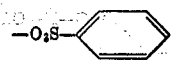

(a hydrazinium betaine).

Specific but nonlimiting examples of the anion $A^-$ are as follows: arsenate, orthoborate, bromide, carbonate, chloride, chloraurate, chloroplatinate, chromate, dichromate, cyanate, cyanide, ferricyanide, ferrocyanide, fluoborate, fluoride, fluorosilicate, iodide, molybdotungstate, nitrate, nitrocobaltate, phosphate, pantothenate, penicilloate, phosphomolybdotungstate, silicate, sulfate, sulfamate, sulfide, thiocyanate, thiosulfate; acetate, benzenesulfonate, benzoate, camphorate, citrate, acetylsalicylate, glycollate, gluconate, glucuronate, diliturate, hexafluorophosphate, hydroxide, lactate, methane sulfonate, abietate, phthalate, picrate, fumarate, malate, aconitate, itaconate, tricarballylate, tartrate, toluene sulfonate, oleate, stearate, penicillinate, carbamate, iodomercuriate, gallate, tannate, benzilate, succinate, phenylacetate, oxalate, pyrophosphate, chlorzincate, mandelate, tropate, cinnamate, salicylate, nicotinate, methylenebissalicylate, amphomycin, sulfanilamide, sulfathiazole, sulfacetimide, sulfasuccidine, sulfathalidine and the like.

My novel compounds may be readily prepared by the simple reaction sequence shown in Equations 1, 2 and 3. In all of the equations that follow, the substituents are those designated in the definition, supra. Special designations are noted.

(1) 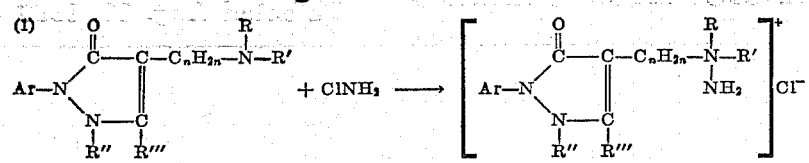

(2) 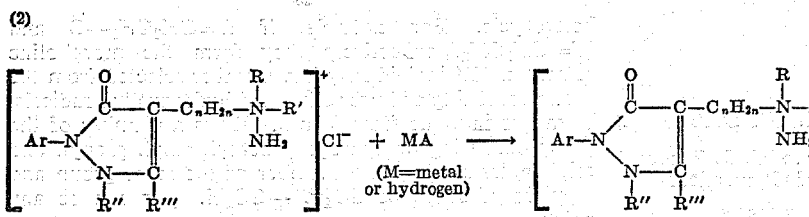

(3) 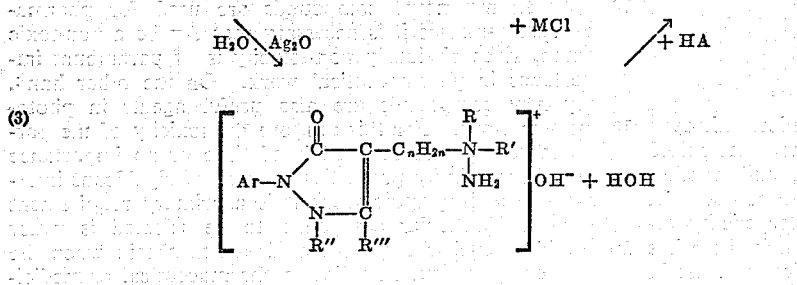

The tertiary pyrazolones which I employ as bases in the preparation of my novel products are many in number and type. A few of these, e.g., aminopyrine:

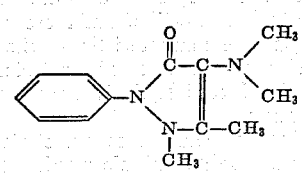

and dipyrone:

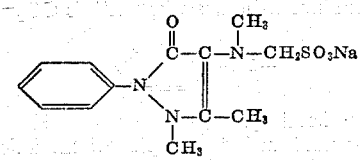

are commercially available. Other tertiary amines useful for the purposes of the present invention are prepared from available pyrazolones as shown in Equations 4, 5 and 6, or by other reactions known to those skilled in the science of preparative chemistry.

(4) 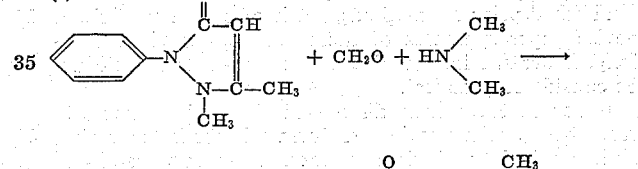

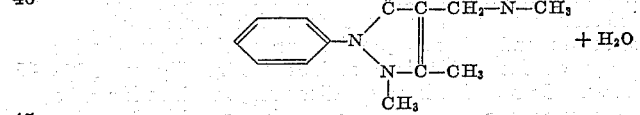

(5) 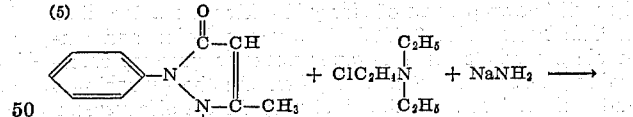

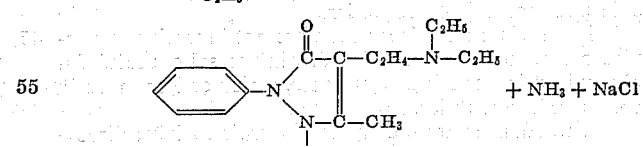

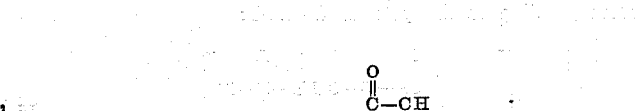

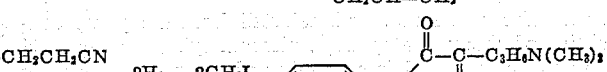

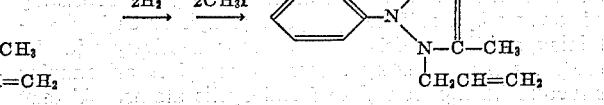

By such known reactions there can be prepared the following pyrazolones which are illustrative of those suitable for conversion to our novel compounds.

TABLE I (1) 1,5-dimethyl-4-dimethylamino-2-phenyl-3-pyrazolone

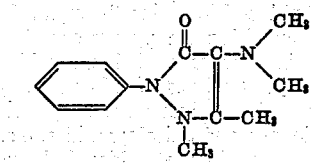

(2) 1,5-dimethyl-4-dimethylamino-2-(fluorophenyl)-3-pyrazolone

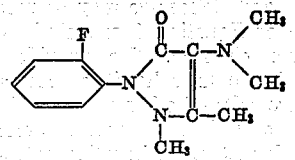

(3) 1,5-dimethyl-4-dimethylamino-2-(3-nitrophenyl)-3-pyrazolone

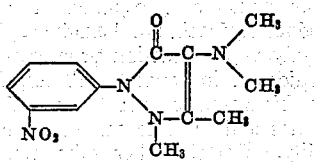

(4) 1,5-dimethyl-4-dimethylamino-2-(4-nitrophenyl)-3-pyrazolone

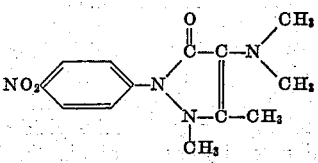

(5) 1,5-dimethyl-4-dimethylamino-2-(3-carboxyphenyl)-3-pyrazolone

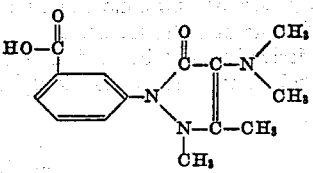

(6) 1,5-dimethyl-4-dimethylamino-2-(4-bromophenyl)-3-pyrazolone

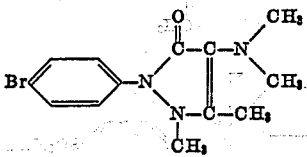

(7) 1,5-dimethyl-4-dimethylamino-2-(4-chlorophenyl)-3-pyrazolone

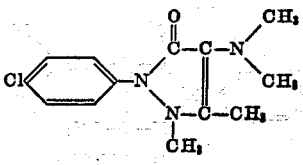

(8) 1-ethyl-5-methyl-4-dimethylamino-2-(3-chlorophenyl)-3-pyrazolone

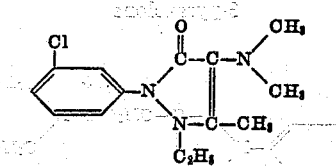

(9) 1,5-diethyl-4-diethylamino-2-(4-sulfophenyl)-3-pyrazolone

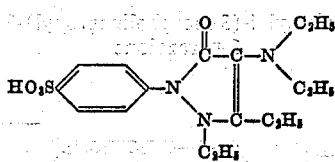

(10) 1,5-dimethyl-4-dimethylaminomethyl-2-phenyl-3-pyrazolone

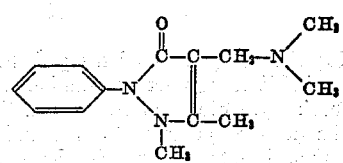

(11) 1,5-dimethyl-4-morpholinomethyl-2-phenyl-3-pyrazolone

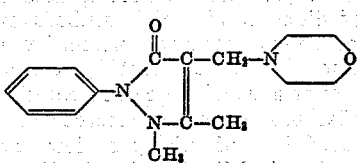

(12) 1,5-dimethyl-4-pyrolidinomethyl-2-phenyl-3-pyrazolone

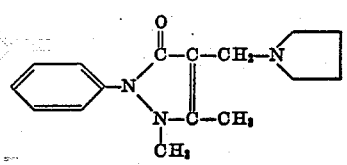

(13) Piperazine bis-(2-p-chlorophenyl-1,5-dimethyl-3-pyrazolonyl-4-methane)

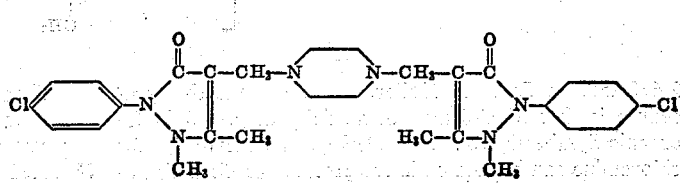

(14) 1-allyl-5-methyl-4-di-n-propylaminomethyl-2-phenyl-3-pyrazolone

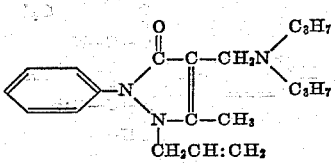

(15) 1-methyl-4-(2-diethylaminopropyl)-2-phenyl-3-pyrazolone

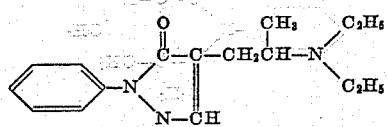

(16) 1,5-diethyl-4-(3-morpholinopropyl)-2-phenyl-3-pyrazolone

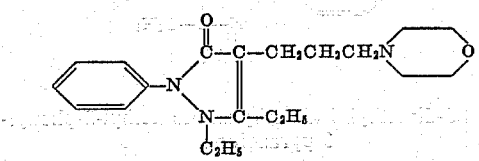

In preparing the compounds of the present invention it is usually suitable to contact chloramine with a solution of the basic pyrazolone, allow the reaction to proceed until the desired quantity of chloramine is consumed, and then isolate and purify the resultant hydrazinium chloride by standard laboratory techniques. While chloramine is most advantageously prepared in a form of a gaseous chloramine-ammonia-nitrogen stream obtained from a generator constructed according to the teachings of Sisler et al., other methods are equally adaptable for the purposes of the present invention. For instance, chloramine can be made by reacting chlorine with an excess of ammonia in carbon tetrachloride solution or similar halogenated hydrocarbon solvent under controlled conditions of mixing at low temperatures. Such a procedure is fully described in U.S. Patent No. 2,678,258, to John F. Haller. Another effective procedure is that of Coleman et al. fully described in Inorganic Syntheses, vol. I, 59 (1939). Alternatively, the chloramine can be formed in the presence of the amine as described in my co-pending application S.N. 605,230, filed August 20, 1956, which teaches the reaction of chlorine and a tertiary amine in the presence of excess ammonia. For simplicity, when both the base and product are soluble in the same inert solvent, e.g., chloroform, we have formed chloramine in situ by this method in the solution containing the pyrazolone.

The choice of solvent is one of economy and simplicity. For good absorption (and therefore reaction) it is desirable to bubble chloramine through a long column of a solution comprising the pyrazolone dissolved in a relatively cheap inert solvent. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbontetrachloride, trichlorethylene, and chlorobenzene; nitroaromatics, e.g., nitrobenzene. For special purposes, water and other hydroxylic solvents such as ethanol and Cellosolve may be used.

The reaction of Equation 1 can obviously only yield the hydrazinium chloride. To provide other useful pyrazolonyl hydrazinium salts, it is necessary, by metathesis, to prepare salts of other anions. The reaction of Equation 2 or a variant is most commonly used for this purpose. For example, hexafluorophosphates, iodomercuriates, stearates and the like can be readily obtained by mixing aqueous solutions of the hydrazinium chloride and the appropriate reagent; e.g., hydrazinium chloride and potassium hexafluorophosphate. More often than not, the product hydrazinium hexafluorophosphate precipitates directly as the reaction progresses. In general, bromides, iodides, thiocyanates, sulfates, fluorosilicates, ferricyanides, bichromates, picrates, picrolonates, dilliturates, styphnates and the like can be obtained with this relative facility. Certain other salts, e.g., the nitrates, pencillinates, perchlorates and sulfamates, are more water soluble than the chloride and are therefore not formed under such conditions. Many organic salts, e.g., the benzoates, acetylsalicylates, mandelates, and citrates are best made in an aqueous alcohol solution. The nitrates have been readily prepared by mixing alcoholic solutions containing equivalent quantities of silver nitrate and the hydrazinium chloride, filtering off the silver chloride which precipitates in quantitative yield and evaporating the solution to dryness to obtain the hydrazinium nitrate. This procedure is also efficacious in preparing salts of the pyrazolonyl compounds with acidic antibiotic polypeptides such as amphomycin. In this case, the alkali metal salts of the antibiotic can be used in place of silver salts. Salts of other medicinals, e.g., the acidic sulfanilamide derivatives can be made in either aqueous or anhydrous solutions as shown in Equation 7:

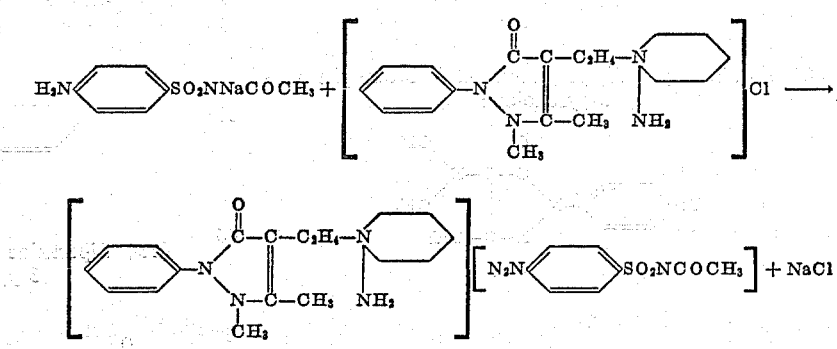

When a highly insoluble salt is to be formed from the anion of a relatively water-soluble acid, the acid itself may be used to furnish the anion. Thus adding saturated aqueous solutions of phthalic acid even to dilute solutions of many of the hydrazinium chlorides gives a sometimes slow, but always quantitative, precipitate of the hydrazinium phthalate. Many oxalates and picrates have been prepared by this method. The salts obtained by these, or other methods, are generally crystalline solids, depending largely on the nature of the anion. Bulky organic anions, e.g., stearate, oleate, abietate, etc., tend to yield waxy or pasty products. Bulky inorganic anions such as phosphotungstomolybdates and ferricyanides tend to yield amorphous powders of very high decomposition points. Salt derived from simpler organic and inorganic anions which are in themselves very soluble, e.g., succinate, citrate, tartrate, gluconate, acetate, and nitrate tend to be relatively low-melting (70–150° C.), water-soluble, and sometimes hygroscopic. The hydrazinium hydroxides, best prepared by the action of freshly precipitated $Ag_2O$ on the hydrazinium chlorides (see Equation 3) are very hygroscopic and difficult to isolate. They show a marked tendency to react with atmospheric acids such as $CO_2$ (Equation 8).

(8)

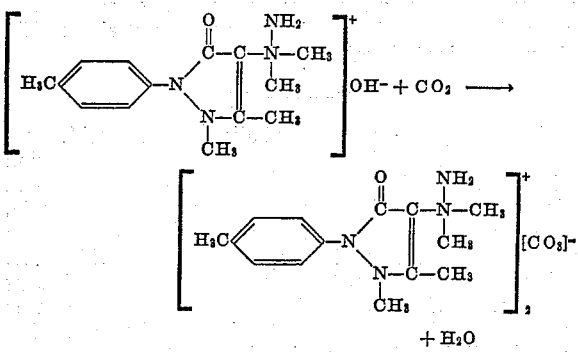

I have also found it desirable to prepare other salts, including representative phenates, e.g., from sodium pentachlorophenate.

My invention is further illustrated but not delimited by the following specific examples:

Example I

A chloramine generator was constructed according to the teachings of Sisler et al., supra. The generator consists of a horizontal Erlenmeyer flask, the bottom of which contains an outlet tube which is directed into the reactor containing liquid tertiary amine. Ammonia and chlorine (which may be diluted with nitrogen) are introduced separately into the top of the flask through concentric conduits. Chloramine and ammonium chloride are formed in the flask at the point where the chlorine and ammonia vapors come into contact. A rod is provided in the chlorine inlet stream to prevent any plugging of that stream with ammonium chloride. The outlet end of the flask is masked with glass wool to collect any ammonium chloride particles which otherwise would be directed into the bath of the amine. The chloramine yield for any one set of gas flow meter readings is determined by removing the reactor and generating the chloramine directly into a series of three chilled traps. Under the conditions of chloramine generation, only ammonia, chloramine, and nitrogen can pass through the glass wool into the traps. Since the traps are maintained at at least —70° C., the ammonia and chloramine condense therein and react relatively slow (compared to the chlorine-ammonia reaction velocity) to form nitrogen and ammonium chloride. By allowing the low temperature condensate to come to room temperature slowly, the chloramine is converted quantitatively to non-volatile (at 20–30° C.) ammonium chloride, while the ammonia and nitrogen escape by volatilization. Therefore titration of the white residue (obtained on evaporation of the condensate) for chloride gives a direct measure of the chloramine generated. This can be related back to a measure of the chlorine used to obtain the chloramine yield.

There is an alternate procedure which is suitable for use when chloramine is actually being consumed by reaction with a tertiary amine. The amount of chlorine used in a run, which is the limiting reagent quantity for yield calculation, can be measured directly, e.g., by weight of the chlorine cylinder before and after use, or by use of flow meters. The amount of ammonium chloride retained within the generator is determinable by titrating an aliquot of the aqueous solution of all of the solid remaining within the chloramine generator after the reaction has been completed. The chloramine yield, expressed as percent of the theoretical yield, can then be calculated from the formula:

$$\text{Percent} = \frac{(A-B)200}{A}$$

where A is the total number of moles of chlorine passed into the generator and B is the number of equivalents of chloride retained within the generator. The chloride content of the generator thus serves as an indicator of chloramine efficiency.

Example II

A solution of 20.2 g. of 1,5-dimethyl-4-dimethylamino-2-phenyl-3-pyrazolone, commercially available as "Pyramidon" or "Aminopyrine" was completely dissolved in 100 ml. of xylene, and treated with the chloramine from the generator described in Example I. The chloramine treatment continued for about 85 minutes using in all about one-tenth mole of chloramine. Of this, approximately half escaped without reaction because of insufficient contact time obtained in the 3-necked flask. The reaction was slow and slightly exothermic; the temperature rose from 32–37° C. After gasification, the reaction mixture became red-brown. It contained some solid and also some active chloride determined by the standard potassium iodide-acetic acid test. The mixture was allowed to stand overnight by which time all of the active chloride had disappeared. It was filtered and the residue was washed with three 100 ml. portions of $C_8H_{10}$. The filtrate and the washings were combined and evaporated to dryness. The residue thus obtained was 6.5 g. of a red-brown solid which by analysis was 86% pure, 1,1-dimethyl - 1-(1,5-dimethyl-2-phenyl-3-pyrazolonyl-4)hydrazinium chloride. Alternatively, this compound can be named, 1,1-dimethyl-1-(antipyrinyl-4)hydrazinium chloride. The novel product darkened at 144° C. and melted with decomposition at 147° C. The yield corresponded to approximately 50% chloramine conversion. The crude product was dissolved in cold isopropyl alcohol, filtered free of ammonium chloride and evaporated dry to give a dark red syrup which was water soluble. Vacuum evaporation converted the syrup to dark red rhombic crystals which were wet with oil. These were nuchared in water, then precipitated from isopropyl alcohol solution with diethyl ether to give off-white clusters of prisms melting at 153° C. and above with decomposition. The purified product was soluble in water, methyl alcohol, ethyl alcohol, isopropyl alcohol, Cellosolve and chloroform; insoluble in ethyl acetate, diethyl ether and xylene. The preparative reaction of this novel compound is shown below in Equation 9:

(9)

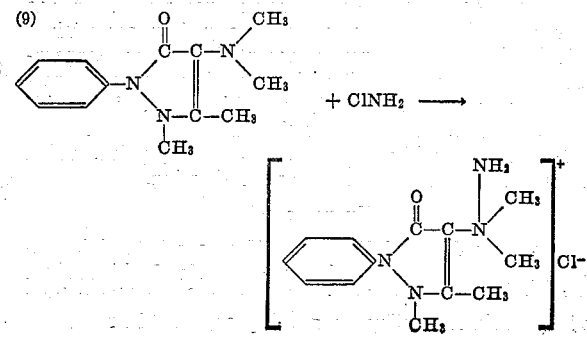

Example III

An aqueous solution of the product of Example II was treated with aqueous potassium hexafluorophosphate to give the corresponding hydrazinium hexafluorophosphate. The crude product melted at 174–176° C. After recrystallization from absolute ethanol the melting point obtained was 180° C.

The dull yellow picrate was formed upon treatment of aqueous hydrazinium chloride with saturated aqueous picric acid solution. This novel product decomposed at about 182° C.

An immediate yellow precipitate was obtained by treating the hydrazinium chloride with aqueous potassium mercuri-iodide. This precipitate, the hydrazinium iodomercuriate, became dark brown in air. It melted at 73–74° C. to give a red liquid.

Example IV

An aqueous solution of the product of Example II, 1 g. in 10 ml. of water at pH 7.5–8.0, was treated with a saturated aqueous solution of calcium acetoxybenzoate (1.5 g.). The mixture was allowed to stand overnight. From it was obtained a 78% yield of 1,1-dimethyl-1-(antipyrinyl-4)hydrazinium 2-acetoxybenzoate, as long needles which melted from 145–147° C. It was recrystallized from water as fine needles melting at 149–149.5° C. The preparative reaction is shown in Equation 10 below.

(10)

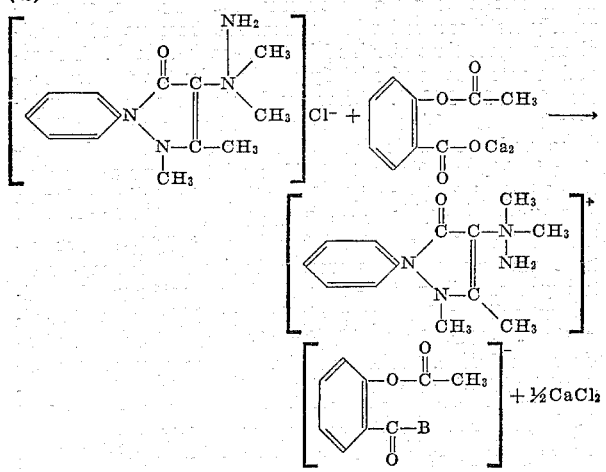

Example V

The procedure of Example II was substantially repeated; however, the 3-necked flask used as the reactor was replaced with a modified Fisher-Milligan gas absorption bottle. Using the modified apparatus, the chloramine gas instead of bubbling through approximately two inches of aminopyrine solution, bubbled through a head of approximately 35 inches. The result was a near quantitative absorption of chloramine in an 86% conversion to light brown 1,1-dimethyl-1-(antipyrinyl-4-)hydrazinium chloride. The crude product melted between 142–145° C. It contained appreciably less ammonium chloride than the crude product of Example II. It was extracted with chloroform and the yellow ammonium chloride-free solution was evaporated at room temperature to give a yellow oil which on trituration with acetone gave off-white fine prisms melting at 152° C. with decomposition. Recrystallization from a chloroform-xylene mixture did not change the melting point, which is markedly dependent on the rate of heating.

Example VI

The procedure of Example IV was substantially repeated by treating the product of Example V with sodium salicylate. The resulting product was fine white prisms of hydrazinium salicylate melting at 187–188.5° C.

Example VII

Methyl alcohol solutions of potassium penicillin G and antipyrinyl dimethyl hydrazinium chloride, were mixed and evaporated to dryness in a nitrogen stream. The reaction mixture was taken up in chloroform, charcoaled, filtered, reevaporated to dryness in the absence of air, redissolved in chloroform, and the process repeated. The product was finally precipitated from an acetone solution by the addition of excess peroxide-free ether, and appeared a clear, tacky gum of the penicillin salt, which could not be crystallized by vacuum-drying, trituration, or chilling. It ran clear at 55° C., and decomposed with gas evolution at 65°. It was readily soluble in chloroform (potassium penicillin G is not), acetone (the hydrazinium chloride is not) and alcohol, but only slightly soluble in cold water (both reactants are highly water-soluble).

Example VIII

The product of Example V was treated with calcium amphomycin, the calcium salt of an antibiotic, acidic polypeptide. The reaction mixture was allowed to stand overnight and a reddish salt decomposing at about 185° C. was obtained therefrom.

Example IX

A large quantity of morpholine hydrochloride was prepared by saturating a cold dry diethyl ether solution of morpholine with dry HCl, filtering out of contact with air and vacuum drying in a desiccator over sulfuric acid. 22.58 g. of antipyrine (0.12 moles) was mixed with 14.83 g. (0.12 mole) of morpholine hydrochloride. The mixture was treated with 10 g. of formalin (equivalent to 3.6 g. or 0.12 mol formaldehyde). Within ten minutes after the mixing most of the solid had dissolved. The resulting light yellow solution increased in temperature from 28 to 45° C. by the heat of the reaction. On standing overnight, the solution gelled because of product precipitation. After the addition of an excess of 20% sodium hydroxide solution, the product was filtered and washed with a little water (in which it is soluble). The air-dried crude 1,5-dimethyl-4-(morpholino-4-methyl)-2-phenyl-3-pyrazolone, melting point of 129–130° C. (literature value 131° C., see Chemical Abstracts 13, 2511), was obtained therefrom in quantitative yield. This preparation is shown in Equation 11 hereunder.

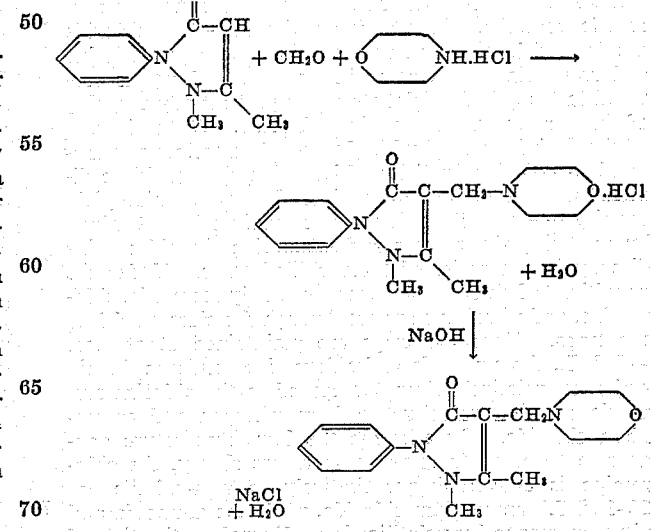

Example X

The procedure of Example IX was substantially repeated with 10 g. of formalin, 22.58 g. of antipyrine and 9.78 g. (.12 m) dimethylamine hydrochloride. The reaction was less exothermic than that of Example IX and less complete after 24 hours. The reaction mixture was therefore allowed to stand for 48 hours. The viscous clear reaction mixture was diluted with water and treated with excess sodium hydroxide, extracted with three 40 ml. portions of chloroform and evaporated in air. It gave 79.9% of theory of crude 1,5-dimethyl-4-dimethyl-aminomethyl-2-phenyl-3-pyrazolone. See preparative Equation 12 shown hereunder.

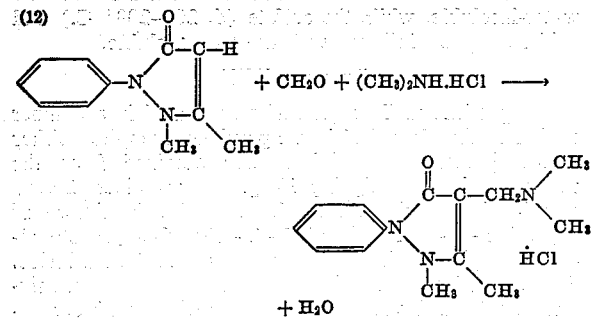

*Example XI*

The procedure of the two preceding examples was substantially repeated using 12.9 g. of pyrrolidine hydrochloride. Using the work-up technique similar to that described in Example X, a quantitative yield of crude 1,5-dimethyl-4-pyrrolidinomethyl-2-phenyl-3-pyrazolone was obtained therefrom. See Equation 13.

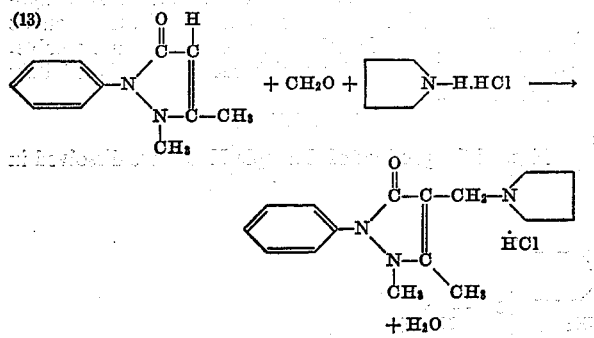

*Example XII*

The procedure of the preceding examples was substantially repeated using 14.6 piperidine hydrochloride. The resulting product was 32.5 g. of 1,5-dimethyl-4-piperidinomethyl-2-phenyl-3-pyrazolone. The yield thereby obtained represented 95% of theory. See Equation 14 below.

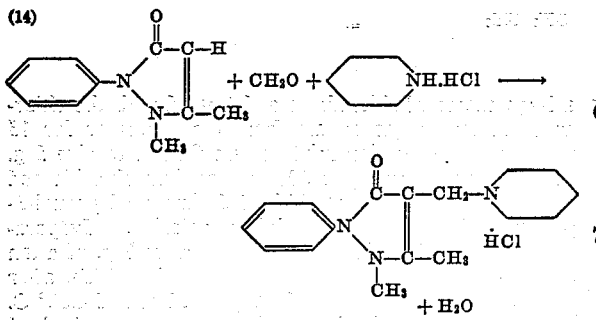

*Example XIII*

3.98 g. (0.025 mole) of piperazine dihydrochloride was treated with 1.5 g. of formaldehyde (4.3 g. formalin) and 9.51 g. (.05 mole) antipyrine. An exothermic reaction ensued and within 1 minute a gel was formed. Water was added to the mixture to dissolve the gel. Using a work-up procedure similar to that described in Example X, a quantitative yield of N,N'-bis(1,5-dimethyl-2-phenyl-3-pyrazolonyl-4-)methyl piperazine was obtained therefrom. See Equation 15 below.

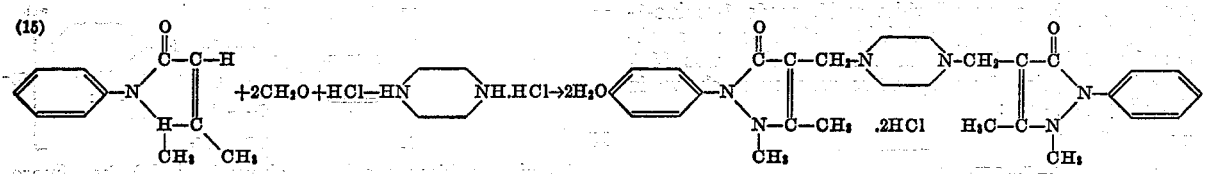

*Example XIV*

The generator of Example I was adjusted to permit the reaction of a gaseous chlorine-nitrogen stream with ammonia at flow rates of 0.065 mole, 0.018 mole, and 0.350 mole per minute respectively. Under these operating conditions the yield of chloramine obtained was 87% of theory.

20 g. of the product of Example X were completely dissolved in chloroform and subjected to chloramine-ammonia stream from the generator for a period of 30 minutes. The mixture was allowed to stand overnight, after which time it gave a negative response to the active chloride tests. It was filtered and 4 g. of air-dried residue were obtained therefrom. Evaporation of the combined filtrate and wash gave 27 g. more of crude brown 1,1-dimethyl-1-antipyrinyl-4-)methyl hydrazinium chloride, decomposing 148–151° C. This product was extracted with cold isopropyl alcohol and filtered free of ammonium chloride. It was then evaporated to dryness in an air stream to give a dark red oil which, under vacuum, largely solidified. The product was soluble in water, chloroform, methyl alcohol and isopropyl alcohol; it was insoluble in carbon tetrachloride, diethyl ether, dimethyl ketone, ethyl acetate and dioxane. It was purified by precipitation from concentrated chloroform solution by acetone. The preparative reaction is shown in Equation 16 below:

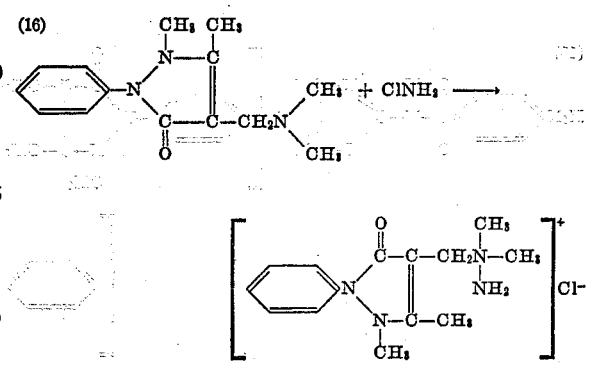

Using alternative nomenclature to that indicated aforesaid, the product could be named 1,1-dimethyl-1-(1,5-dimethyl-2-phenyl-3-pyrazolonyl-4-)methyl hydrazinium chloride. It softens, under very slight pressure, at about room temperature, melts clear at about 55° C., and darkens and decomposes with gas evolution from about 100° C. on. Its picrate is a dull yellow, air-oxidizable gum.

Its hexafluorophosphate, amorphous and unstable, decomposes indefinitely beginning at about 143° C. The citrate, benzoate, mandelate, sulfate, and nitrate are highly hygroscopic and intractable gums. The iodide, yellowish brown, relatively water-soluble, decomposes with darkening from about 162° C. on.

Example XV

Using a procedure similar to that of Example XIV the product of Example XI, dimethylpyrrolidinomethylphenylpyrazolone in chloroform solution, was subjected to chloramine and ammonia from the generator. A precipitate formed in the reaction mixture as the reaction progressed. 32 g. of off-white solid, crude 1-amino-1-(antipyrinyl-4-)methylpyrrolidinium chloride were obtained therefrom. The product thus obtained was 66% pure by analysis. Its preparative reaction is shown in Equation 17 below:

(17)

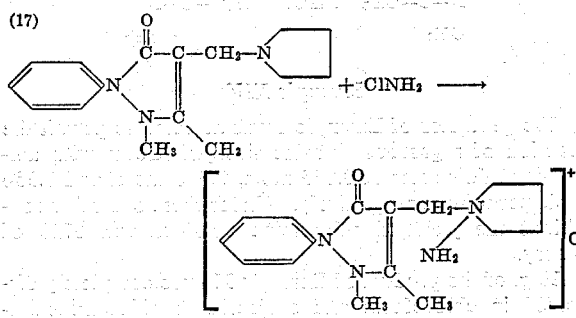

The product was extracted with chloroform, and precipitated from this solution by addition of acetone. It was purified by repeated precipitations from charcoaled solutions in chloroform and alcohol by addition of acetone or xylene. Vacuum drying the gum thus obtained gave a tacky, hygroscopic brown gum which had very nearly the correct chloride analysis (calculated 11%, found 10.4%). Repetition of this partitioning procedure several times finally gave an off-white, amorphous solid, the amino pyrrolidinium chloride, which melted and decomposed at about 128° C. The dull yellow picrate darkened at about 107° C., and melted to a black tar at about 131° C. The amorphous yellow hexafluorophosphate decomposed at approximately 152° C. The citrate, benzoate, phthalate and mandelate were hygroscopic gums. The nitrate, which melted at slightly above room temperature, was highly hygroscopic and air sensitive. Its salt with sodium sulfathiazole, formed in aqueous solution according to Equation 18.

groscopic solid melting clear at about 125–130° C. Its preparative reaction is shown in Equation 19.

(19)

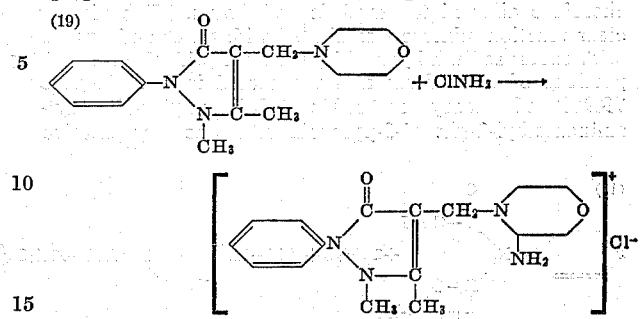

Its picrate (decomposing at about 137° C.), hexafluorophosphate (melting point about 132–133.5° C. with gas evolution) and sulfacetimide salt (d. about 179° C.) are water-insoluble, while the sulfate (d. 206–209° C.) and acid succinate (deliquescent) are water-soluble.

Example XVII

The product of Example XII was treated in a manner similar to that described in the previous examples. After chloramination, a precipitate was obtained from the reaction mixture weighing 37 g. It contained 20.9% chloride ion, equivalent to about an 80:20 mixture of 1 - amino - 1 - (1,5 - dimethyl - 2 - phenyl-3-pyrazolonyl-4-)methylpiperidinium chloride and ammonium chloride. Purification by recrystallization from ethanol-acetone mixtures gave soft, hygroscopic crystals, melting with decomposition at about 142° C. With appropriate treatment the product gave a picrate, very fine canary yellow needles, d. 170° C., and a hexafluorophosphate, fine white rods, melting point 174–175° C., with preliminary darkening. Its salts with sulfapyridine and sulfathiazole were uncrystallizable oils. Although it failed to yield a water-insoluble salt with penicillin G, it formed slowy the corresponding penicilloate, d. 187–191° C. Very slow evaporation of the mixed aqueous solutions of the reactants gave the amphomycin salt as a somewhat water-soluble, voluminous white powder, which decomposed indefinitely above 200° C.

Example XVIII 10 g. of the product of Example XIII were dissolved in (18)

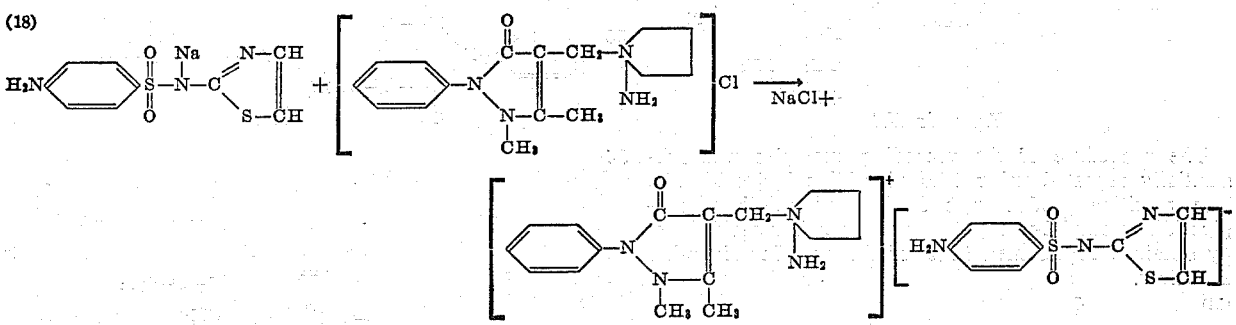

This novel salt shows loss of water at about 98° C., and decomposes at about 145° C.

Example XVI

The procedure of Example XIV was substantially repeated using as a reactant the product of Example IX. After the chloramination was complete, a 29 g. residue of crude reddish brown 4-amino-4-(1,5-dimethyl-2-phenyl-3-pyrazonoyl-4-)methylmorpholinium chloride was obtained in admixture with ammonium chloride in approximately 80–20 proportions. The novel product was a hya large excess of chloroform and treated with the chloramine-ammonia gas stream from the generator for 15 minutes. The reaction mixture was filtered to give 5 g. of solid containing about 60% ammonium chloride and 40% crude 1-amino-1,4-bis-(1,5-dimethyl-2-phenyl-3-pyrazolonyl-4-)methylpiperazinium chloride. Evaporation of the combined filtrate and wash gave 7 g. of a tan crude product, pure piperazinium chloride, which, after recrystallization, decomposed and melted at 206–208° C. From the recrystallization mother liquors was obtained slightly more than one-tenth of a gram of an additional organic salt (B in Equation 20 below), decomposing at about 260° C., which I believe to be 1,4-diamino-1,4-bis-(1,5 - dimethyl - 2 - phenyl - 3 - pyrazolonyl - 4 - methyl)-piperazinium dichloride. Its hexafluorophosphate derivative decomposed without clear-cut melting at about 212° C. The mono chloramine adduct (A in Equation 20) gave an amorphous, dull yellow picrate that darkened and melted at 164–165° C., and a faintly pink, microcrystalline hexafluorophosphate that melted with decomposition at 153–155° C.

(20)

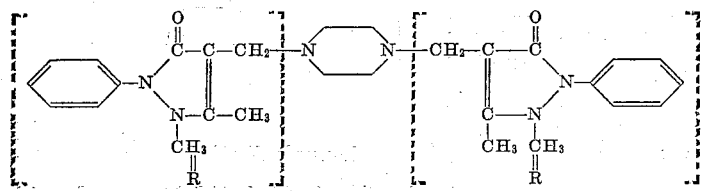 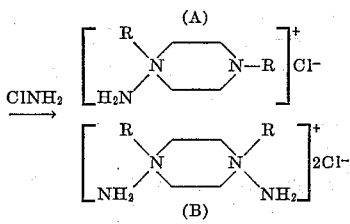

Example XIX 20 g. of 1,5-dimethyl-2-phenyl-4-(N-methyl-N-sulfomethyl)amino-3-pyrazolone, available commercially as "Novalgin" or "Dipyrone," were dissolved in 50 ml. of water. This aqueous solution was treated with a total of 2.1 equivalents of chloramine from the generator over a period of about 82 minutes. The resulting cherry red solution was evaporated to dryness to give 28 g. of crude 1-methyl-1-sulfomethyl-1-(1,5-dimethyl-2-phenyl-3-pyrazolonyl-4-)hydrazinium betaine (see Equation 21 below). The tan, slightly hygroscopic solid, part of which darkened and melted at 160–163° C., was purified by washing with alcohol (which removed unreacted Dipyrone), extracting with chloroform and evaporating to dryness (which separated it from ammonium chloride). Recrystallization from chloroform-carbon tetrachloride mixtures gave the weakly yellow, water-soluble betaine, an amorphous, brittle resin which melted at 112–113° C. and decomposed with the evolution of gas at that temperature. It could not be converted to the common derivatives by the described procedures. However, on passing a stream of anhydrous hydrogen chloride through a cold chloroform solution there is precipitated an off-white, deliquescent amorphous solid, presumably the sulfomethyl hydrazinium chloride.

(21)

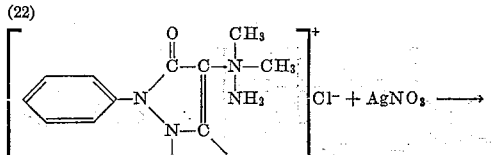

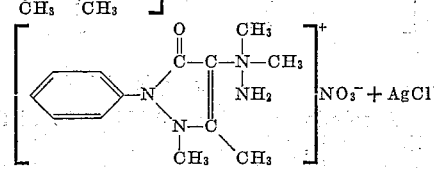

Example XX

Twenty percent solutions (if such was not possible, saturated aqueous solutions) of potassium permanganate, potassium ferrocyanide, sodium sulfocyanate, potassium mercuri-iodide, sodium dichromate, ferric chloride, potassium iodide, sodium citrate, sodium gluconate, sodium acetate, sodium sulfathiazole, sodium diethyldithiocarbamate and 5-nitrobarbituric acid were prepared. These solutions were mixed with one-fourth their volume of 5% aqueous solution of the chloramine adducts of aminopyrine (the product of Example II) 1,5-dimethyl-2-phenyl-4-piperidinomethyl-3-pyrazolone (the product of Example XVII), and Dipyrone (the product of Example XIX). The results obtained thereby are shown in Table 2 below:

TABLE 2.—HYDRAZINIUM CHLORIDE PRODUCT

| Reagent | Example II | Example XVII | Example XIX |
|---|---|---|---|
| FeCl$_3$ | purple solution, fading quickly | no change | blue solution which turned green. |
| KMnO$_4$ | very rapid reduction | no precipitate, slow reduction | immediate reduction. |
| K$_3$Fe(CN)$_6$ | transient greener solution | no precipitate | no change. |
| KHgI$_3$ | gummy yellow precipitate | white precipitate unstable | Do. |
| KI | slow yellow precipitate | no precipitate | Do. |
| NaSCN | no change | do | Do. |
| Na$_2$Cr$_2$O$_7$ | slow yellow-brown precipitate | do | Do. |
| Sodium citrate | no change | do | Do. |
| Sodium gluconate | do | do | Do. |
| Sodium acetate | do | do | Do. |
| Sodium sulfathiazole | do | do | Do. |
| Sodium diethyldithiocarbamate | slow precipitate | do | Do. |
| 5-nitrobarbituric acid | precipitate, d.>200° | yellow precipitate, d.>200° | yellow precipitate, d.>200°. |

Example XXI 0.3 g. of the product of Example II were dissolved in 5 ml. of deionized water and treated with an equivalent of silver nitrate as a 0.1 N aqueous solution. An excess of two drops of silver nitrate solution were added thereto. The resulting reaction mixture was filtered and washed well with deionized water. The filtrate was concentrated in vacuo to give 0.31 g. of vacuum dried, hygroscopic tan crystals. The hydrazinium nitrate thus obtained melts in water at slightly above room temperature at atmospheric pressure. It decomposes at about 120° C. The preparative reaction is shown hereunder in Equation 22.

(22)

Example XXII 0.25 g. of the product of Example XV were dissolved in 10 ml. of water and treated with 0.55 equivalent of silver sulfate as a saturated aqueous solution. The mixture was allowed to stand for two hours and thereafter filtered and washed well with cold water until the wash liquor was free of silver ions. The resulting mass was separately slurried with 5% ammonium hydroxide solution in three 50 ml. portions and each time allowed to stand 5 minutes before filtration. The material was finally washed once with water and vacuum dried to give a low yield of the hydrazinium sulfate which melted with decomposition at about 182° C. See Equation 23 below:

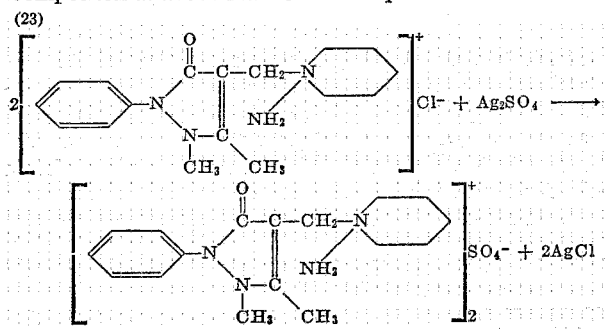

*Example XXIII*

0.01 mole each of the product of Example X and calcium gluconate were suspended in 50 ml. of 95% ethanol and refluxed for three hours. The mixture was filtered and the hot filtrate evaporated dry. The substance thereby obtained was washed well with ethyl ether to remove calcium chloride, and with chloroform to remove any excess of the produce of Example X. It was then recrystallized from isopropyl alcohol and ethyl acetate to give a low yield of frangible, hygroscopic white lumps which decomposed indefinitely at about 200° C. The preparative reaction is shown in Equation 24.

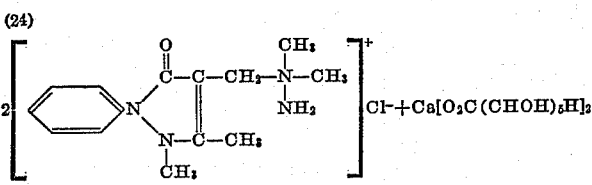

*Example XXIV*

A solution containing 0.001 mole of the product of Example II, a like amount of potassium pencillin G in 50 ml. of water and approximately 10 mg. of hydroquinone was evaporated dry at 10–15° C. using a stream of deoxygenated nitrogen as the vapor carrier. The light tan residue was washed with ethyl ether to remove the hydroquinone (in a nitrogen atmosphere) and then extracted in nitrogen-saturated isopropyl alcohol using three 30 ml. portions. Evaporation of the extract followed by vacuum drying, gave a 52% yield of once recrystallized 1,1-dimethyl-1-(antipyrinyl-4-)hydrazinium penicillin G salt. This novel product decomposed above 150° C. The preparative reaction is shown below in Equation 25.

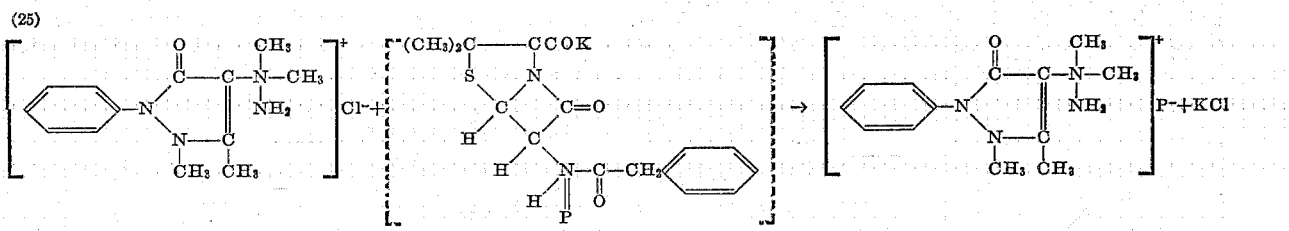

*Example XXV*

0.001 mole of sodium barbital (U.S.P.) was refluxed in 100 ml. of absolute ethanol for 20 minutes. The resulting solution was filtered hot into 100 ml. of an absolute ethanol solution containing 0.01 mole of the product of Example II. This mixture was refluxed for an additional two hours. It was filtered hot, allowed to cool and refiltered. The filtration residue contained sodium chloride and a small amount of the product. The filtrate was evaporated dry in a nitrogen stream, then recrystallized with decolorization from an isopropyl alcohol-ethyl acetate mixture to give a 72% yield of 1,1-dimethyl-1-antipyrinylhydrazinium 5,5-diethylbarbiturate, decomposing above 184° C. The preparative reaction is shown below in Equation 26.

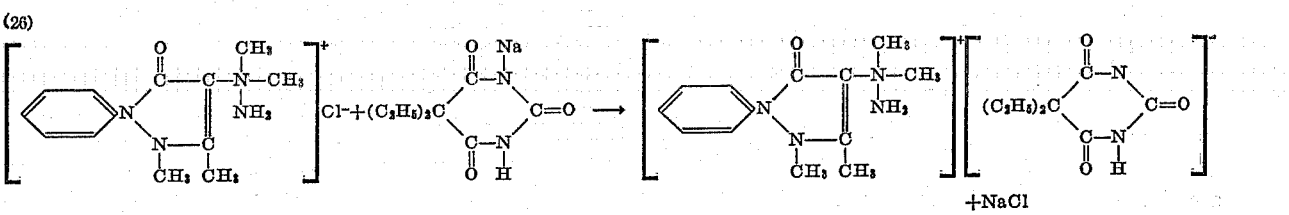

My novel salts have remarkable properties which make them especially useful as pharmaceuticals, agents for photographic work, and dyestuffs. Perhaps the most important use for these new compounds is as pharmaceutical ingredients. Almost since the time that Knorr first prepared antipyrine, the effectiveness of this type of compound as an antipyretic analgetic has been demonstrated. My novel products maintain these remarkable properties as well as possessing the additional antispasmodic action characteristics of the quaternized nitrogen compounds. In comparison with the salts of aminopyrine and antipyrine, my novel salts, e.g., the nitrate, chloride, acetate and the like are frequently more water-soluble and the aqueous solutions thereof are invariably more clearly neutral and much more stable to alkali. Two specific illustrations will demonstrate these desirable properties.

First, aminopyrine hydrochloride is a deliquescent solid which is freely soluble in water. The aqueous solutions have a strongly acid reaction. The product of Example II is a non-deliquescing white solid which is freely soluble in water; its aqueous solutions have a pH of about 6.5 (just about neutral). Treatment of a 10% antipyrine hydrochloride solution with a relatively weak base such as ammonium hydroxide causes precipitation of free aminopyrine. Treatment of the corresponding hydrazinium salt in water with ammonium hydroxide produces no effect; from the clear solution the aminopyrine hydrazinium salt can be recovered quantitatively, e.g., by evaporation.

Second, aminopyrine forms compounds with barbiturates which have been recommended as analgesic-sedatives. These hot-water-soluble, cold water-insoluble products, on being treated with a cold aqueous sodium carbonate or hydrochloric acid are split into their components. Such a hydrolysis is noticeable even in the presence of inorganic salts alone. The barbital salt of the hydrazinium compounds, however, are not hydrolyzed by cold bases, salts or acids.

This desirable resistance to simple hydrolysis makes our products valuable ingredients of medicinal mixtures, e.g., in analgesic sedative formulations containing a barbiturate. In such cases, it is often unnecessary, and therefore undesirable, to prepare beforehand the barbiturate hydrazinium salt, since simple dry mixing of its two progenitors effectively gives the product.

Some of my novel salts have amazing powers as microbial agents. When tested by the Oxford cup technique, the acetylsalicylate hydrazinium salt of aminopyrine was approximately as effective against nutrient agar colonies of *P. aeruginosa, S. marescens,* and *E. coli* as a comparable concentration (0.01%) of phenol or Zephiran. It was more effective than phenol against *Ch. globosum* (potato agar colonies) at 0.01% concentrations.

My novel products are also useful as chemical intermediates. Two examples will suffice to establish this:

First, active aldehydes, e.g., chloral and formaldehyde, condense readily with the hydrazinium compounds to form crystalline derivatives. With chloral, chloral hydrate, chloral alcoholate, butyl chloral or its hydrate, the products are useful analgetic-sedatives, similar to the commercially available Trigemin but appreciably more water-soluble. With formaldehyde, condensates having two hydrazinium moieties connected by a methylene group can be obtained. These have shown some value as special anti-oxidants.

Second, I have found that diazonium salts react with these hydrazinium compounds according to the reaction:

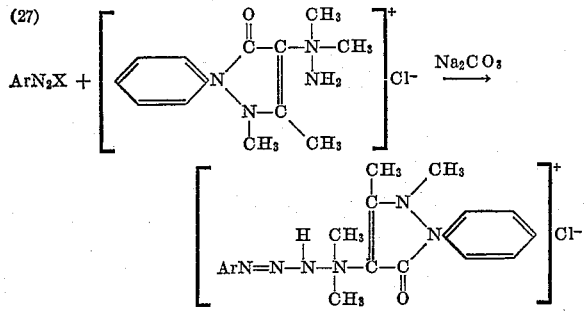

These novel products are analogous to the commercially important stabilized diazo compounds available under such trade names as Levamine.

My novel pyrazolonyl hydrazinium salts are, under certain conditions, unexpectedly effective antioxidants and reducing agents. This is true of the salts in general, e.g., chlorides, thiocyanates, sulfates and acetates, but the utility of the compounds varies somewhat with the nature of the anion. Thus the ascorbates, sorbates, and glutaconates—salts of unsaturated lower alkyl acids— are marked reducing agents, rather than anti-oxidants. The halides, for example are primarily anti-oxidants rather than reductants. They are, for example, relatively stable to many common oxidants in an acidic atmosphere, but in alkaline media, they react readily with oxidizing agents. This inherently characteristic chemical property is valuable in many fields, for example, photography. Both hydrazine and pyrazolone derivatives are known to be of value in photographic development (see Mees, "Theory of the Photographic Process," pages 535-619, 1038-9). The hydrozines would be far more useful in this work, however, if the effective, cheaper ones were more water-soluble and less toxic (see Kirby, U.S. Patent No. 2,220,929 (1940)). The heterocycles also suffer the disadvantage of insufficient water solubility. I have found that my novel products, derivatives of both the pyrazolones and the aryl hydrozines, are highly water-soluble developers capable of controlled reduction of the silver halide in a photographic film.

I claim:

1. Compounds according to claim 9 wherein R and R' are lower alkyl, and $n$ equals 0.

2. Compounds according to claim 9 wherein R and R' are lower alkyl, and $n$ equals 1.

3. Compounds according to claim 9 wherein R is sulfoalkyl, R' is lower alkyl, and $n$ is 0.

4. 1,1-dimethyl-1-(1,5-dimethyl-2-phenyl - 3 - pyrazolonyl-4)-hydrazinium 2-acetoxybenzoate.

5. 1,1-dimethyl - 1 - (1,5-dimethyl-2-phenyl-3-pyrazolonyl-4)-methylhydrazinium chloride.

6. 4-amino - 4 - (1,5-dimethyl-2-phenyl-3-pyrazonyl-4)-methylmorpholinium chloride.

7. 1-amino - 1 - (1,5-dimethyl-2-phenyl-3-pyrazolonyl-4)-methylpiperidinium chloride.

8. 1-methyl - 1 - sulfomethyl-(1,5-dimethyl-2-phenyl-3-pyrazolonyl-4)-hydrazinium betaine.

9. New chemical compounds having the general formula:

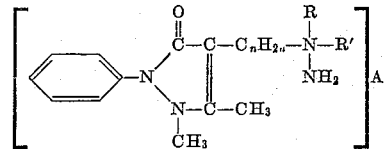

wherein R, taken alone, is a member selected from the group consisting of lower alkyl, hydroxy lower alkyl and sulfoalkyl; R', taken alone, is a member selected from the group consisting of lower alkyl and hydroxy lower alkyl; R and R', taken together with the N on which they are both substituents, form a non-aromatic ring selected from the group consisting of morpholine, piperidine, piperazine and pyrrolidine; $n$ has the values of 3, 2, 1 and 0; and A is a pharmaceutically acceptable anion.

10. Compounds according to claim 9 wherein R and R' taken together with the N on which they are both substituents form the morpholine ring and $n$ equals 1.

11. Compounds according to claim 9 wherein R and R' taken together with the N on which they are both substituents form the piperidine ring and $n$ equals 1.

References Cited in the file of this patent

Omietanski et al.: J. Am. Chem. Soc., vol. 78, p. 1211 et seq., January–March 1956.

UNITED STATES PATENT OFFICE
Certificate of Correction

Patent No. 2,899,432            August 11, 1959

Bernard Rudner

It is hereby certified that error appears in the printed specification of the above numbered patent requiring correction and that the said Letters Patent should read as corrected below.

Columns 3 and 4, the equation shown between lines 61 and 72 should be numbered —(6)— at line 61; columns 7 and 8, lines 56 to 68, left of the equation insert —(7)— at line 56; same equation (7), line 66, for "N₂N" read —H₂N—; column 12, line 14, for "65°." read —65° C.—; column 13, lines 10 to 15, left-hand portion of Equation (15) should appear as shown below instead of as in the patent—

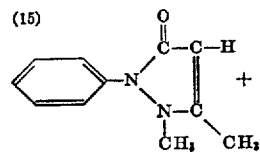

Signed and sealed this 1st day of March 1960.

[SEAL]

Attest:
KARL H. AXLINE,
*Attesting Officer.*

ROBERT C. WATSON,
*Commissioner of Patents.*